United States Patent

Hermann et al.

[11] Patent Number: 6,031,734
[45] Date of Patent: Feb. 29, 2000

[54] SWITCHED-MODE POWER SUPPLY WITH THRESHOLD VALUE CIRCUIT

[75] Inventors: Wolfgang Hermann, Tennenbronn; Reinhard Kögel, Brigachtal; Jean Paul Louvel; Peter Scharlach, both of Villingen-Schwenningen, all of Germany

[73] Assignee: Deutsche Thomson-Brandt GmbH, Villingen-Schwenningen, Germany

[21] Appl. No.: 09/241,462

[22] Filed: Feb. 2, 1999

[30] Foreign Application Priority Data

Feb. 13, 1998 [DE] Germany .......................... 198 05 927

[51] Int. Cl.[7] .......................... H02M 3/335; H02M 3/24; H02H 7/10; H02H 7/122
[52] U.S. Cl. .................. 363/19; 363/50; 363/55; 363/123; 363/97; 323/901
[58] Field of Search .................. 363/19, 49, 50, 363/55, 56, 123, 97, 95, 131; 323/901

[56] References Cited

U.S. PATENT DOCUMENTS

| | | | |
|---|---|---|---|
| 4,277,824 | 7/1981 | Alberkrack | 363/49 |
| 4,323,961 | 4/1982 | Josephson | 363/56 |
| 4,680,687 | 7/1987 | Stasch et al. | 363/18 |
| 5,083,254 | 1/1992 | Feldtkeller | 363/21 |
| 5,506,764 | 4/1996 | Hon et al. | 363/21 |
| 5,748,461 | 5/1998 | Preller | 363/97 |

FOREIGN PATENT DOCUMENTS 217378  1/1985  German Dem. Rep. ........ H02M 1/08

OTHER PUBLICATIONS

Search Report for German Patent Appln. No. 19805927.2.
JP 61–109458 A., In: Patents Abstracts of Japan, E–443, Oct. 4, 1986, vol. 10, No. 293.

*Primary Examiner*—Peter S. Wong
*Assistant Examiner*—Bao Q. Vu
*Attorney, Agent, or Firm*—Joseph S. Tripoli; Joseph J. Laks; Daniel E. Sragow

[57] ABSTRACT

Switched-mode power supplies having a switching transistor and a transformer, with whose primary winding the switching transistor is connected in series, usually require a starting circuit, which is connected to an input voltage. Since a current continually flows through the starting circuit even during normal operation, it is endeavoured to keep the said current as small as possible. The switched-mode power supply comprises a threshold value circuit, for example a Zener diode connected in series with a resistor, which keeps the driver circuit turned off after the switching-on of the switched-mode power supply, until the operating voltage for the driver circuit has exceeded a specific threshold value which is referred to one end of a winding on the primary side. As a result of this, it is possible to charge a charging capacitor via the starting circuit with a low current, without currents flowing away. The threshold value circuit is advantageously connected by one end to that end of a secondary winding which, by means of positive feedback, assists the activation of the driver stage.

7 Claims, 2 Drawing Sheets

SWITCHED-MODE POWER SUPPLY WITH THRESHOLD VALUE CIRCUIT

BACKGROUND OF THE INVENTION

The present invention relates to a switched-mode power supply having a switching transistor, a transformer having a primary winding, which is connected in series with the switching transistor, and at least one secondary winding, a starting circuit, a driver circuit for driving the switching transistor, and a threshold value circuit.

Switched-mode power supplies of this type require a starting circuit through which, after the switching-on of the switched-mode power supply, a current flows for the purpose of supplying the driver stage, since otherwise the switched-mode power supply does not start oscillating. This current must also be sufficiently large to activate transistors of the driver stage and to supply the switching transistor with a sufficiently large control voltage or a control current so that the said transistor is activated. When the switching transistor is activated, a first current flows through the primary winding of the transformer, as a result of which a voltage is produced across a secondary winding, for the purpose of supplying the driver circuit. In the course of further operation, the switched-mode power supply supplies itself with power to a sufficient extent via this winding, with the result that the starting circuit is no longer required.

However, since the starting circuit is continually in operation and consumes power of the order of magnitude of one watt or more, this is highly undesirable particularly in the case of switched-mode power supplies which have a standby mode or are connected for a long time or permanently.

In order to reduce the power loss, switched-mode power supplies of various designs are known, some of which are complicated, however, as specified in DE 196 52 604, or require a starting oscillator, as described in EP 0 701 318 A1. Other designs for reducing the standby power loss, such as supplementary devices for switching off a television set, described in EP 0 804 026 A2, for example, entail disadvantages for a user under certain circumstances, since they do not react selectively to remote-control signals.

WO92/17934 discloses a starting circuit for a switched-mode power supply, which starting circuit has an integrated circuit with a Zener diode through which delayed switching-on of the integrated circuit is effected. During the delay phase, the integrated circuit is initialized and the parameters and components are brought to a defined state. At the end of the initialization phase, the integrated circuit is changed over to steady-state normal pulse operation.

The object of the present invention is to specify a switched-mode power supply of the type mentioned in the introduction in which the power consumption of the starting circuit can be kept as low as possible.

SUMMARY OF THE INVENTION

The switched-mode power supply of the present invention contains a threshold value circuit which, after the switch-on operation, turns the driver stage off, until the operating voltage for the driver stage has exceeded a predetermined threshold value. As a result of this, the starting circuit can be held at high impedance, with the result that a storage capacitor that supplies the driver circuit can be charged slowly without the current in the network of the driver circuit trickling away. If the voltage across the storage capacitor is sufficiently large and exceeds a specific voltage value, then the driver circuit starts to operate and activates the switching transistor. The threshold value circuit is connected by a further terminal to an end of a secondary winding that carries an AC voltage.

The threshold value circuit is connected to an input of the driver circuit, a voltage which rises in dependence on the charging operation of the storage capacitor being present at the said input. If the voltage at this terminal exceeds the predetermined threshold value, then the driver stage is activated. In order to generate the threshold value, in the simplest embodiment, the threshold value circuit may comprise a Zener diode which is connected in series with a resistor and is connected to a reference potential of the switched-mode power supply via one end of the secondary winding. The threshold value circuit is advantageously connected by one end to that end of a secondary winding which, by means of positive feedback, assists the activation of the driver stage.

The threshold value circuit can be used, in particular, for a free-running switched-mode power supply without a starting oscillator, which power supply is more critical in terms of its starting behaviour than other switched-mode power supplies. Particularly when an npn transistor is used as the switching transistor, a sufficient power (current and voltage) is necessary in order to activate it. In this exemplary embodiment, the threshold value circuit is connected to an end of the secondary winding which carries a negative voltage in the turned-on phase of the switching transistor, with the result that positive feedback occurs. The change in the voltage across the secondary winding is utilized here in order further to increase the control current of the driver transistor, with the result that the switching transistor is reliably activated.

The threshold value circuit can likewise be used advantageously for a switched-mode power supply with a field-effect transistor as the switching transistor. In this case, the driver circuit is connected by one terminal to an end of the secondary winding which carries a positive voltage in the turned-off phase of the field-effect transistor. As a result of this, the switched-mode power supply requires only one secondary winding on the primary side for the supply voltage of the driver circuit and of the threshold value circuit. Moreover, in the event of a short circuit in which the positive voltage at the end of this winding drops, the free-running oscillation of the switched-mode power supply is reliably stopped.

The threshold value circuit ensures that the switched-mode power supply starts reliably even with a starting circuit having a low power loss and also has stable operation during normal operation. The invention can be used, in particular, for free-running switched-mode power supplies according to the flyback converter principle which have a standby operating mode, such as, for example, for television sets, video recorders, satellite receivers or set-top boxes.

The invention is explained in more detail below, by way of example, with reference to schematic circuit diagrams, in which:

DESCRIPTION OF THE PREFERRED EMBODIMENTS

Figure 1:
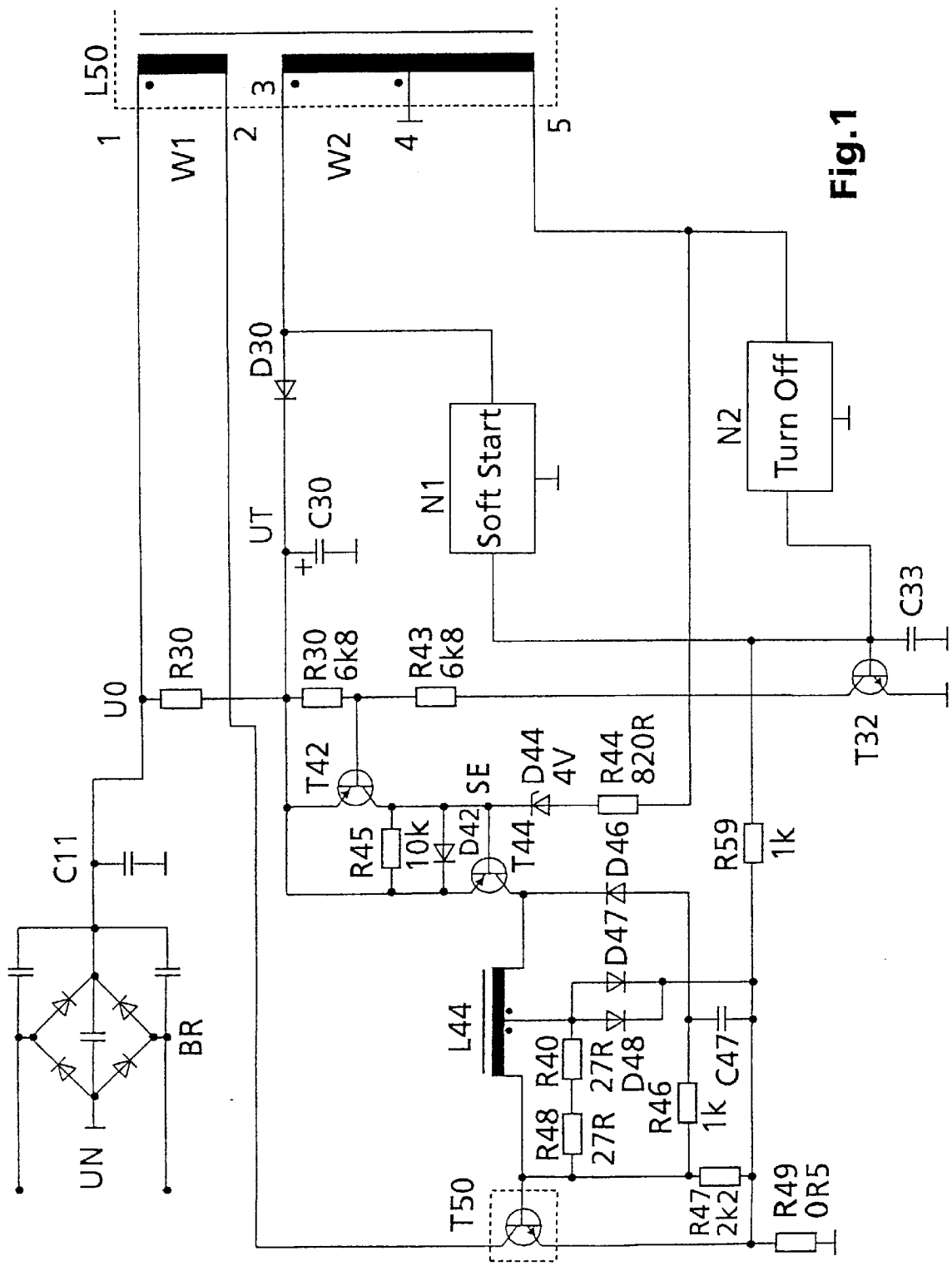
FIG. 1 shows a free-running switched-mode power supply with an npn transistor as the switching transistor.

The switched-mode power supply illustrated in FIG. 1 contains a bridge rectifier BR and a downstream capacitor C11, by means of which a rectified, smoothed voltage U0 is made available. This voltage is applied to a primary winding W1 of an isolating transformer L50, which primary winding is connected in series with a switching transistor T50. A secondary winding W2, which is arranged on the primary side, serves to supply the driver circuit of the switching transistor T50. The switched-mode power supply is designed as a flyback converter and has further secondary windings of loads arranged on the secondary side, not illustrated in FIG. 1.

The secondary winding W2 has three ends 3, 4, 5, end 4 being connected to a reference potential, to earth in this exemplary embodiment, and the end 3 carrying a positive voltage in the activated phase of the switching transistor T50 and the end 5 a negative voltage. The voltages present at these ends 3 and 5 reverse polarity in the turned-off phase. The end 3 is connected via a diode D30 to a storage capacitor C30, whereby the driver circuit is supplied with a rectified operating voltage UT during the switching operation.

The driver circuit contains two transistor stages T42, T44 and a wired-up coil L44, via which the switching transistor T50 is activated and turned off. The coil L44 enables a rising control current for the purpose of activating the switching transistor T50 and simultaneously effects a negative voltage for the purpose of turning the switching transistor off, whereby losses in the driver circuit and switching-off losses of the switching transistor are kept low. The functioning of the coil L44 has already been described in EP-A-0 786 866 and, therefore, is not explained any further here.

In the turned-on phase of the switching transistor T50, the transistor T42 is in the off state and the transistor T44 is in the on state, with the result that a sufficiently high control current is made available via the end 3 of the secondary winding W2.

The switching-off of the switching transistor T50 is effected by means of a capacitor C33 and a transistor T32, which is activated at a specific voltage across the said capacitor. In this case, the capacitor C33 is charged during the turned-on phase by a resistor R49, which is connected in the current path of the switching transistor T50, and a passive network N1, which is connected to the end 3 of the winding W2 and essentially corrects fluctuations in the voltage U0 and provides soft-start information. If the voltage across this capacitor exceeds the base-emitter voltage of the transistor T32, then the latter is activated and thereby pulls the voltage present at the base of the transistor T42 to a lower value, with the result that the latter is activated. Consequently, the voltage SE at the base of the transistor T44 rises, with the result that the latter turns off and, consequently, the switching transistor T50 likewise turns off.

In the turned-off phase of the switching transistor T50, the energy stored in the transformer L50 is transferred to the secondary windings for the purpose of supplying the loads. If the magnetic energy in the transformer L50 has decayed, then the transistor T32 is turned off by means of a passive network N2, which is connected to the end 5 of the winding W2. Consequently, the transistor T42 is also turned off, with the result that the transistor T44 is activated and the turned-off phase of the switching transistor T50 is thus ended.

The switched-mode power supply contains a starting circuit having one or more resistors R30, which delivers a small current of 1 mA, for example, by means of which the storage capacitor C30 is charged after the switched-mode power supply has been switched on. A Zener diode D44, which is connected via a resistor R44, via the winding W2, to the earth potential present at the end 4, keeps the transistor T44 turned off in this starting phase. In this case, the transistor T32 is likewise in the off state since there is no voltage present at its base, with the result that the transistor T42 is likewise in the off state. Therefore, the components connected to the storage capacitor C30 are all in the off state or completely de-energized in the starting phase, with the result that the said capacitor can be charged via the starting circuit R30 with a very small current, without this current trickling away to earth. If the operating voltage UT applied to the emitter of the transistor T44 exceeds the threshold value voltage SE, formed by the Zener voltage, plus the base-emitter voltage, then a current flows through the emitter-base junction of the transistor T44, with the result that the latter is switched on.

The Zener voltage of the Zener diode D44 is chosen such that the transistor T44 switches on for example at a voltage of about 4.5 V across the storage capacitor C30. The energy stored in this capacitor is thus sufficient to activate the switching transistor T50. As a result of this, a positive voltage occurs at the end 3 of the winding W2 by virtue of the induction of the transformer L50 and maintains the base current for the switching transistor T50. At the same time, a second important effect of the circuit occurs: the activation of the switching transistor T50 effects a negative voltage at the end 5 of the winding W2, whereby the voltage SE across the Zener diode D44 is pulled downwards. Positive feedback is produced which relatively rapidly activates the transistor T44 and thus the switching transistor T50.

During the turned-off phase of the switching transistor T50, the voltage at the end 5 of the winding W2 is positive and the voltage SE is high, with the result that the transistor T44 remains reliably turned off during the entire turned-off phase. Parasitic oscillations that can influence the switching behaviour of the transistor T32 during the turned-off phase do not play a part, since the threshold value circuit always keeps the base voltage of the transistor T44 positive.

In the starting phase, the turning-off of the switching transistor T50 is likewise effected by means of the transistor T32, as already described above. As a result of this, the switched-mode power supply is free-running and, both in the starting phase and in normal operation, has reliable operation on account of the threshold value circuit with the Zener diode D44 and the resistor R44. A starting oscillator is not required.

When an npn switching transistor is used, the driver circuit with the transistors T42 and T44 is in this case connected to the end 3 of the winding W2, which end delivers a positive voltage when the switching transistor T50 is activated. As a result of this, a desired dependence on the mains voltage UN is obtained: at a high mains voltage UN, the end 3 delivers a higher voltage and thus a higher base current for the switching transistor T50, with the result that a desired base current/collector current ratio of the switching transistor T50 can be adhered to even in the event of fluctuating or varying mains voltages UN. In addition, the value of the capacitor C30 can be kept very small, at 10 nF, since the base current of the switching transistor T50 is delivered by the winding W2.

Figure 2:
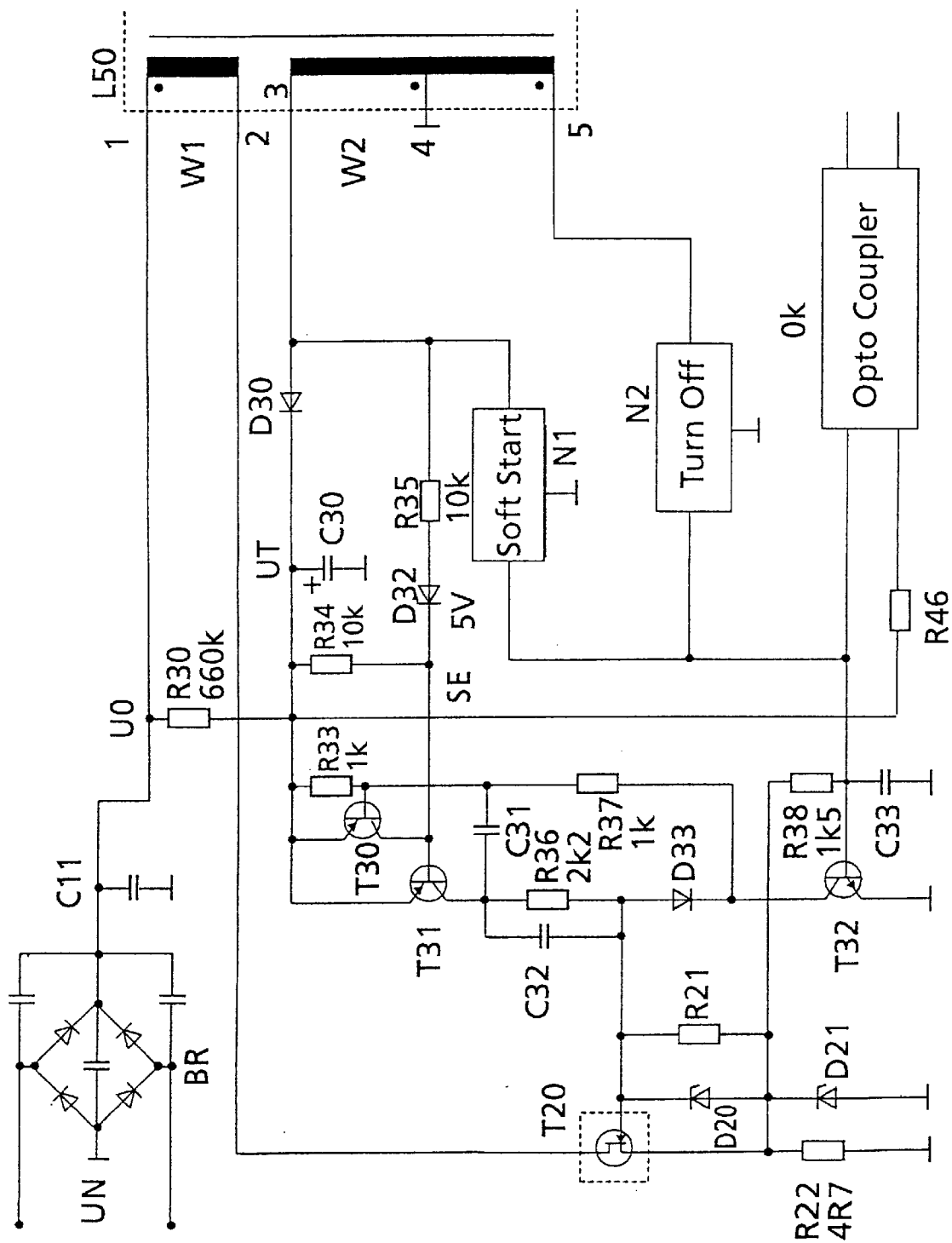
FIG. 2 shows a free-running switched-mode power supply with a field-effect transistor as the switching transistor.

The switched-mode power supply of FIG. 2 uses a field-effect transistor T20 as the switching transistor, which is controlled by means of voltages, with the result that the driver stage does not have to provide high currents. In this case, the activation and turning-off of the field-effect transistor T20 are likewise effected by means of the transistor T32, which is wired up in a similar manner to that in FIG. 1. In this case, an optocoupler OK is additionally connected to the capacitor C33, by means of which direct regulation of a secondary-side output voltage is effected.

The driver circuit contains two transistors T30, T31, by means of which, together with the transistor T32, the field-effect transistor T20 is controlled. During normal operation, in the turned-on phase, the transistor T32 is in the off state, with the result that the transistor T32 is likewise in the off state. The transistor T31 is in the on state since its base is connected via a Zener diode D32 and a resistor R35, the threshold value circuit, to that end 3 of the winding W2 which carries a negative voltage in the turned-on phase. In the turned-off phase, the transistor T32 is activated, whereby the transistor T30 turns on and effects a short circuit between the base and the emitter of the transistor T31, with the result that the transistor T31 is in the off state. The gate of the field-effect transistor T20 is therefore practically earthed via a diode D33 and the activated transistor T32.

In this case, the starting circuit having one or more resistors R30 is likewise wired up like that of FIG. 1. The switched-mode power supply in this case starts as follows: after the switch-on operation, when the voltage across the capacitor C30 is zero, the voltage across the emitter-base junction of the transistor T31 is likewise zero, with the result that the latter is in the off state and so, too, are the transistors T30 and T32. By virtue of the threshold value circuit with the Zener diode D32 and the resistor R35, the voltage at the base of the transistor T31 is now raised during the starting phase. Only when the voltage UT exceeds a specific threshold value, for example 5.7 V, does a current flow via the emitter-base junction of the transistor T31 and via the Zener diode D32 and R35, with the result that the transistor T31 is activated and consequently activates the field-effect transistor T20.

The threshold value circuit with the Zener diode D32 and the resistor R35 is connected between the base of the transistor T31 and the end 3 of the winding W2. In this case, a positive feedback effect likewise occurs since a negative voltage is present at the end 3 when the field-effect transistor T20 is activated. As a result of this, the transistor T31 is turned on further in the starting phase, with the result that the field-effect transistor T20 is very rapidly activated. The activation is assisted by a capacitor C32, 4.7 nF, which delivers a current surge during activation of the transistor T31 and, as it were, bridges the resistor R36 at this instant.

The activation phase of the field-effect transistor T20 ends when the transistor T32 is activated. As a result of this, the voltage at the base of the transistor T30 drops across the resistor R37 to a low value, with the result that the said transistor is activated and effects a short circuit across the base-emitter junction of the transistor T31, with the result that the latter turns off. At the same time, the voltage at the gate of the field-effect transistor T20 is dropped across the diode D33 by the transistor T32, with the result that the latter likewise turns off. In the turned-off phase, the capacitor C30 is recharged via a diode D30 since a positive voltage is then present at the end 3 of the winding W2. The turning-off of the field-effect transistor T20 is effected by the turning-off of the transistor T32, this already having been explained with reference to FIG. 1.

The transistor T30 of the driver circuit of FIG. 2 is optional, in order to improve the switching behaviour of the switched-mode power supply: without transistor T30, the base of transistor T31 is driven only by the end 3 of the winding W2, whereby optimum timing for the free-running switched-mode power supply is not achieved. By virtue of the transistor T30, then, the transistor T31 is controlled via the transistor T32, as described above, thereby obtaining a better efficiency. This results from the fact that the transistor T31 is kept in the off state during the entire turned-off phase of the field-effect transistor T20 by means of the transistor T32 by way of the transistor T30, since transistor T30 is in the on state and, consequently, transistor T31 is in the off state. This makes it possible to reduce the power value of the components R36 and T32.

The driver circuit with the transistors T30, T31 is in this case connected to an end 3 of the winding W2 which carries a positive voltage in the turned-off phase of the field-effect transistor T20. As a result of this, the voltage across the capacitor C30 is, in a desirable manner, independent of the mains voltage UN (as, too, are the output voltages of the switched-mode power supply to which regulation is effected) on account of the flyback converter principle in contrast to the circuit having the bipolar switching transistor T50, where this is actually desired. The voltage across the capacitor C30 can thereby be held at a constant value of about 10 volts, which suffices for a good switching behaviour of driver stage and field-effect transistor.

The switched-mode power supply of FIG. 1 operates according to the flyback converter principle just like the switched-mode power supply of FIG. 2. Identical components have been provided with the same reference symbols in the figures. The exemplary embodiments described with reference to FIGS. 1 and 2 describe switched-mode power supplies which are operated with a mains voltage UN and contain secondary windings with mains isolation. However, the invention is not restricted to these embodiments. Further applications of the invention, such as, for example, the use as DC-DC converter without mains isolation, are evident to a person skilled in the art of switched-mode power supplies. The use of other switching transistors is likewise obvious to a person skilled in the art.

We claim:

1. Switched-mode power supply comprising a switching transistor, a transformer, with at least one secondary winding and with a primary winding connected in series with said switching transistor, a starting circuit, a driver circuit and a threshold value circuit, which, after a switch-on operation, turns said driver circuit off until the operating voltage for the driver circuit has exceeded a predetermined threshold value, said threshold value circuit being coupled by a first terminal to one end of said secondary winding which carries an alternation voltage and which assists the activation of said driver stage by means of a positive feedback, and by a second terminal to a control input of said driver circuit.

2. Switched-mode power supply according to claim 1, characterized in that said control input is coupled to the operating voltage via a component, with the result that after the switch-on operation, the voltage at said control input rises as a function of the operating voltage up to the voltage value predetermined by said threshold value circuit.

3. Switched-mode power supply according to claim 2, characterized in that said threshold value circuit comprises a Zener diode, which is connected in series with a resistor, for generating a threshold value.

4. Switched-mode power supply according to claim 1, characterized in that said threshold value circuit is connected to an end of said secondary winding which carries a negative voltage in the turned-on phase of said switching transistor.

5. Switched-mode power supply according to claim 4, characterized in that said switching transistor is a field-effect transistor, and in that the transistor of said driver stage which delivers the control voltage for said field-effect transistor is short-circuited via its base-emitter junction by means of a further transistor during the turned-off phase of said field effect transistor for the purpose of reducing losses in said driver stage.

6. Switched-mode power supply according to claim 1, characterized in that the switched-mode power supply is designed according to the flyback converter principle as a free-running switched-mode power supply without an oscillatory.

7. Switched-mode power supply according to claim 1, characterized in that the first terminal of said threshold circuit is connected to said end of said secondary winding which conducts a negative voltage during the switch-on phase of said switching transistor.

* * * * *